US008144731B2

(12) United States Patent
Khandekar et al.

(10) Patent No.: US 8,144,731 B2
(45) Date of Patent: *Mar. 27, 2012

(54) CONTROL CHANNEL SIGNALING IN WIRELESS COMMUNICATIONS

(75) Inventors: Aamod D. Khandekar, San Diego, CA (US); Alexei Y. Gorokhov, San Diego, CA (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 778 days.

This patent is subject to a terminal disclaimer.

(21) Appl. No.: 11/877,139

(22) Filed: Oct. 23, 2007

(65) Prior Publication Data
US 2008/0095122 A1 Apr. 24, 2008

Related U.S. Application Data

(60) Provisional application No. 60/862,647, filed on Oct. 24, 2006.

(51) Int. Cl.
*H04J 11/00* (2006.01)
*H04J 3/16* (2006.01)
(52) U.S. Cl. ........................................ 370/468; 370/208
(58) Field of Classification Search .................. 370/468, 370/329, 332, 335, 341, 344, 347, 337, 203, 370/208, 209, 439, 441, 280, 281, 282
See application file for complete search history.

(56) References Cited

U.S. PATENT DOCUMENTS

| | | | | |
|---|---|---|---|---|
| 6,167,270 A * | 12/2000 | Rezaiifar et al. | ............... | 455/442 |
| 6,526,091 B1 * | 2/2003 | Nystrom et al. | ............... | 375/142 |
| 6,946,981 B1 * | 9/2005 | Zilberman et al. | ............... | 341/50 |
| 7,050,406 B2 * | 5/2006 | Hsu et al. | ...................... | 370/320 |
| 7,471,622 B2 * | 12/2008 | You et al. | ...................... | 370/209 |
| 7,616,610 B2 * | 11/2009 | Kuchibhotla et al. | ......... | 370/335 |
| 7,660,229 B2 * | 2/2010 | Papasakellariou et al. | ... | 370/203 |
| 7,778,307 B2 * | 8/2010 | Kuchibhotla et al. | ......... | 375/145 |
| 2004/0264507 A1 * | 12/2004 | Cho et al. | ...................... | 370/480 |
| 2005/0120097 A1 | 6/2005 | Walton et al. | | |
| 2005/0201296 A1 | 9/2005 | Vannithamby et al. | | |
| 2006/0133455 A1 | 6/2006 | Agrawal et al. | | |

(Continued)

FOREIGN PATENT DOCUMENTS
JP 2007513571 T 5/2007
(Continued)

OTHER PUBLICATIONS

International Search Report—PCT/US07/082362, International Search Authority—European Patent Office, Feb. 16, 2009.

(Continued)

*Primary Examiner* — Hanh Nguyen
(74) *Attorney, Agent, or Firm* — Donald C. Kordich

(57) ABSTRACT

Systems and methodologies are described that facilitate multiplexing control data values over a single physical control channel at least in part by dividing the control channel into one or more logical channels. The physical control channel can have a corresponding Walsh space for transmitting a number of bits, or representations thereof, and the Walsh space can be divided among the logical control channels. Additionally, the logical control channels and/or physical channel can be scrambled according to an identifier of a mobile device (such as MAC ID) to differentiate the data on the channel. Furthermore, a sector identifier can be used to scramble the data where the sector is ascertainable.

34 Claims, 11 Drawing Sheets

U.S. PATENT DOCUMENTS

2008/0130612 A1* 6/2008 Gorokhov et al. ............ 370/342
2008/0181181 A1* 7/2008 Gorokhov et al. ............ 370/335
2009/0257388 A1* 10/2009 Khandekar et al. ........... 370/329

FOREIGN PATENT DOCUMENTS

| JP | 2008503151 A | 1/2008 |
|---|---|---|
| RU | 2260913 | 9/2005 |
| WO | WO0010335 | 2/2000 |
| WO | WO2004039002 | 5/2004 |
| WO | WO2005055527 | 6/2005 |
| WO | WO2006014092 A1 | 2/2006 |

OTHER PUBLICATIONS

Written Opinion—PCT/USO7/082362, International Search Authority—European Patent Office, Feb. 16, 2009.
Taiwan Search Report—TW096139896—TIPO—Dec. 12, 2011.

* cited by examiner

CONTROL CHANNEL SIGNALING IN WIRELESS COMMUNICATIONS

CROSS-REFERENCE TO RELATED APPLICATIONS

This application claims the benefit of U.S. Provisional Patent application Ser. No. 60/862,647 entitled "SYSTEMS AND METHODS FOR CONTROL CHANNEL SIGNALING IN WIRELESS COMMUNICATION SYSTEMS" which was filed Oct. 24, 2006. The entirety of the aforementioned application is herein incorporated by reference.

BACKGROUND

I. Field

The following description relates generally to wireless communications, and more particularly to forward link acknowledgement channels in a wireless communications system.

II. Background

Wireless communication systems are widely deployed to provide various types of communication content such as, for example, voice, data, and so on. Typical wireless communication systems may be multiple-access systems capable of supporting communication with multiple users by sharing available system resources (e.g., bandwidth, transmit power, . . . ). Examples of such multiple-access systems may include code division multiple access (CDMA) systems, time division multiple access (TDMA) systems, frequency division multiple access (FDMA) systems, orthogonal frequency division multiple access (OFDMA) systems, and the like.

Generally, wireless multiple-access communication systems may simultaneously support communication for multiple mobile devices. Each mobile device may communicate with one or more base stations via transmissions on forward and reverse links. The forward link (or downlink) refers to the communication link from base stations to mobile devices, and the reverse link (or uplink) refers to the communication link from mobile devices to base stations. Further, communications between mobile devices and base stations may be established via single-input single-output (SISO) systems, multiple-input single-output (MISO) systems, multiple-input multiple-output (MIMO) systems, and so forth.

In such systems, control data can be sent on forward and/or reverse link channel to utilize in allocating resources to the channel. For example, the control data can be related to channel quality information (CQI), pilot channel data, signal-to-noise ration (SNR) data, etc. Additionally, the control data can be determined based a beacon signal or other signal sent from a transmitting device. Also, a dedicated channel can be established between a mobile device and a base station, or sector thereof, for transmitting the control data.

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection facilitating communicating control data over one or more reverse link channels. The control data can be multiplexed over a single physical control channel by dividing Walsh space available to the physical channel. Walsh sequences can be assigned to one or more logical control channels for transmitting the control data where the logical control channels can utilize the Walsh sequence to transmit control data adjacent to one another.

According to related aspects, a method for communicating over a wireless communications control channel is described herein. The method can include partitioning a control channel into a plurality of logical control channels that respectively relate to one or more portions of available bandwidth. The method can also include mapping control data to an associated logical control channel and transmitting the control data over the logical control channel.

Another aspect relates to a wireless communications apparatus. The wireless communications apparatus can include at least one processor configured to divide a physical control channel into a plurality of logical control channels that share a Walsh space of the physical control channel. The wireless communications apparatus can also include a memory coupled to the at least one processor.

Yet another aspect relates to a wireless communications apparatus for communicating control data. The wireless communications apparatus can comprise means for associating control data with one or more logical control channels and means for multiplexing the one or more logical control channels over one physical control channel. Moreover, the wireless communications apparatus can include means for transmitting the control data over the physical control channel.

Still another aspect relates to a computer program product, which can have a computer-readable medium including code for causing at least one computer to partition a control channel into a plurality of logical control channels that respectively relate to one or more portions of available bandwidth. The code can additionally cause the at least one computer to map control data to an associated logical control channel and transmit the control data over the logical control channel.

In accordance with another aspect, an apparatus in a wireless communication system can include a processor configured to associate control data with one or more logical control channels, multiplex the one or more logical control channels over one physical control channel, and transmit the control data over the physical control channel. Also, the apparatus can include a memory coupled to the processor.

According to a further aspect, a method for interpreting control data in a wireless communications network, is also described herein. The method can comprise descrambling control data received over a physical control channel and determining a logical control channel configuration for the physical control channel. The method can also include demapping one or more control data values based at least in part on the logical control channel configuration.

Another aspect relates to a wireless communications apparatus. The wireless communications apparatus can include at least one processor configured to at least one processor configured to descramble and partition a physical control channel into a plurality of logical control channels respectively comprising disparate control data values. The wireless communications apparatus can also include a memory coupled to the at least one processor.

Yet another aspect relates to a wireless communication apparatus for interpreting control data from one or more mobile devices. The wireless communications apparatus can include means for separating a physical control channel into one or more logical control channels. The wireless communications apparatus can further include means for descrambling the logical control channels according to an identifier of a mobile device related thereto and means for interpreting control data comprised within the control channel.

Still another aspect relates to a computer program product, which can have a computer-readable medium including code for causing at least one computer to descramble control data received over a physical control channel and code for causing the at least one computer to determine a logical control channel configuration for the physical control channel. Moreover, the code can also cause the at least one computer to demap one or more control data values based at least in part on the logical control channel configuration.

In accordance with another aspect, an apparatus can be provided in a wireless communication system including a processor configured to separate a physical control channel into one or more logical control channels, descramble the logical control channels according to an identifier of a mobile devices related thereto, and interpret control data comprised within the control channel. Additionally, the apparatus can comprise a memory coupled to the processor.

To the accomplishment of the foregoing and related ends, the one or more embodiments comprise the features hereinafter fully described and particularly pointed out in the claims. The following description and the annexed drawings set forth in detail certain illustrative aspects of the one or more embodiments. These aspects are indicative, however, of but a few of the various ways in which the principles of various embodiments may be employed and the described embodiments are intended to include all such aspects and their equivalents.

DETAILED DESCRIPTION

Figure 1:
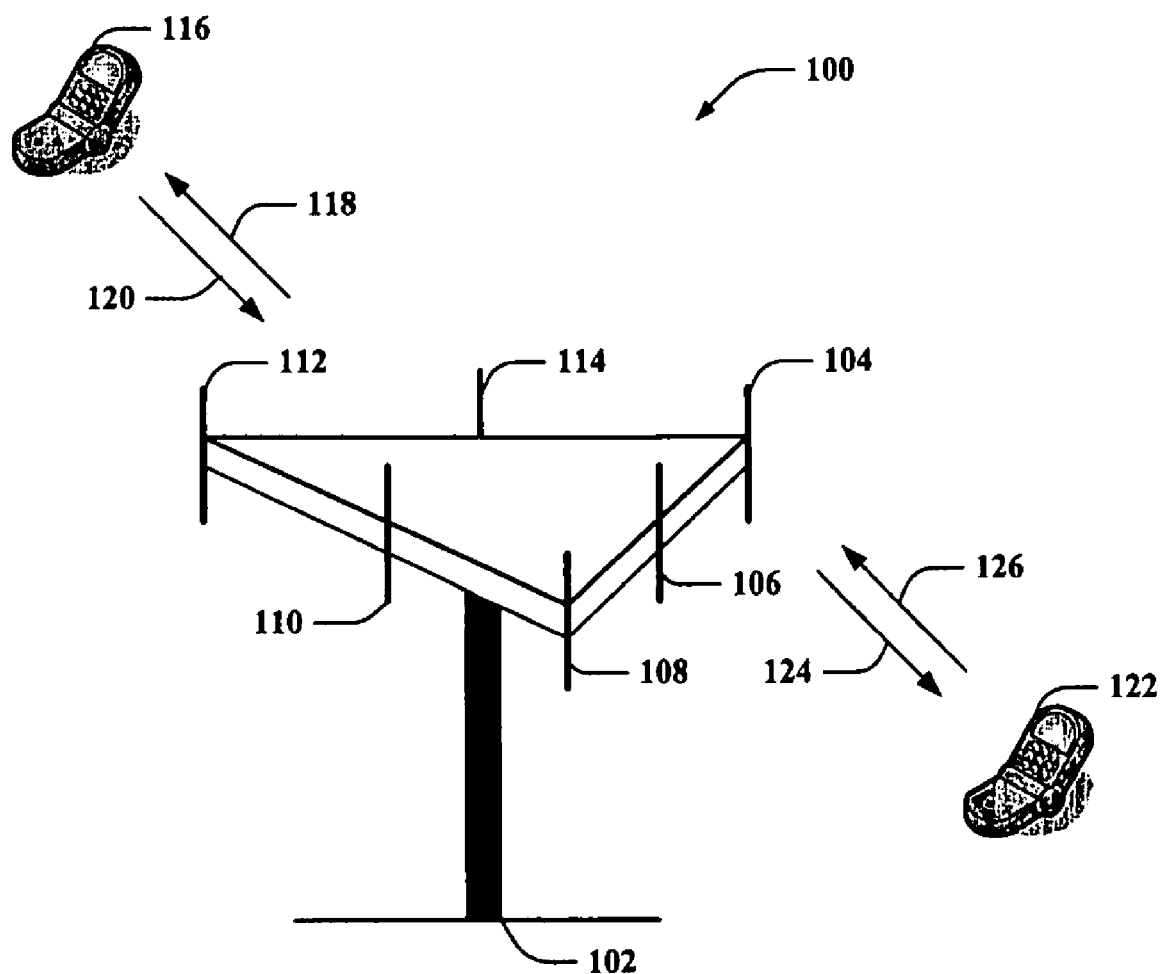
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) can be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

Furthermore, various embodiments are described herein in connection with a mobile device. A mobile device can also be called a system, subscriber unit, subscriber station, mobile station, mobile, remote station, remote terminal, access terminal, user terminal, terminal, wireless communication device, user agent, user device, or user equipment (UE). A mobile device can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with mobile device(s) and can also be referred to as an access point, Node B, or some other terminology.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more mobile devices such as mobile device 116 and mobile device 122; however, it is to be appreciated that base station 102 can communicate with substantially any number of mobile devices similar to mobile devices 116 and 122. Mobile devices 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, mobile device 116 is in communication with antennas 112 and 114, where antennas 112 and 114 transmit information to mobile device 116 over a forward link 118 and receive information from mobile device 116 over a reverse link 120. Moreover, mobile device 122 is in communication with antennas 104 and 106, where antennas 104 and 106 transmit information to mobile device 122 over a forward link 124 and receive information from mobile device 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to mobile devices in a sector of the areas covered by base station 102. In communication over forward links 118 and 124, the transmitting antennas of base station 102 can utilize beamforming to improve signal-to-noise ratio of forward links 118 and 124 for mobile devices 116 and 122. Also, while base station 102 utilizes beamforming to transmit to mobile devices 116 and 122 scattered randomly through an associated coverage, mobile devices in neighboring cells can be subject to less interference as compared to a base station transmitting through a single antenna to all its mobile devices.

According to an example, system 100 can be a multiple-input multiple-output (MIMO) communication system. Further, system 100 can utilize substantially any type of duplexing technique to divide communication channels (e.g., forward link, reverse link, . . . ) such as FDD, TDD, and the like. In one example, the mobile devices 116 and 122 can establish one or more communication channels with the base station 102; one such channel can be a control channel for communicating metrics of the communication, for example channel quality information (CQI) and/or signal to noise ratio (SNR). In addition, a communication or request channel can be established allowing mobile devices 116 and 122 and the base station 102 to communicate request data and control data over different channels in one example. According to an example, the base station 102 can transmit a beacon message received by the mobile devices 116 and 122. The mobile devices 116 and 122 can respond by transmitting control data that can be utilized by the base station 102 in allocating resources to the mobile devices 116 and 122, such as a control channel, reverse-link communications channel, buffer, bandwidth, and the like. In one example, the control channel can be a CDMA channel, an OFDMA channel, and/or a combination of one or more channels thereof (or substantially any other type of communications channel). Additionally, multiple control channels can exist for redundancy, dedicated channels for certain control data, etc.

According to an example, the control channel can also be partitioned into one or more segments for transmitting other data, such as request data. Likewise, a request channel can have some bandwidth set aside for communicating control data. Moreover, the control channel, or communications thereon can be scrambled for security and diversity; for example, a control channel can be specific to a mobile device 116 and 122 and a sector or base station 102. In this regard, the channel communications can be scrambled specific to an identifier of the mobile device 116 and 122 (such as a medium access control (MAC) ID) and/or of the base station 102 or sector. It is to be appreciated that the MAC ID and/or scrambling method can be known by the base station 102. In another example, the mobile devices 116 and 122 can connect to more than one base station for disparate control channels; thus, the mobile device 116 and 122 can be required to scramble communications for one base station using one scrambling and the other using another scrambling, for example.

Figure 2:
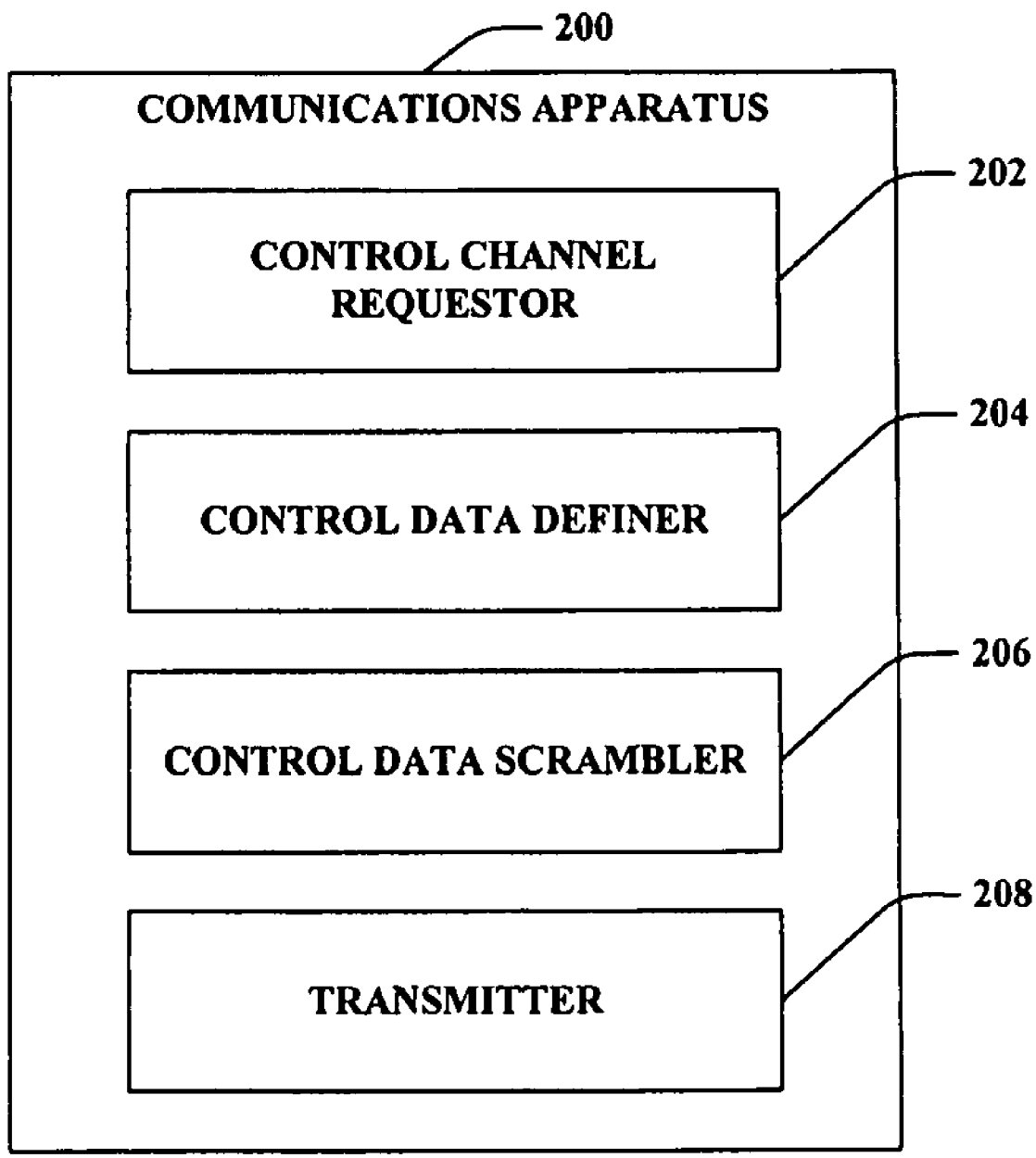
FIG. 2 is an illustration of an example communications apparatus for employment within a wireless communications environment.

Turning to FIG. 2, a communications apparatus 200 for a wireless communications environment is illustrated. Communications apparatus 200 can be a base station, mobile device or a portion thereof, for example. Communications apparatus 200 can comprise a control channel requester 202 that requests establishment of a control channel from an access point or terminal, a control data definer 204 that can define and/or determine values related to channel control, a control data scrambler 206 that can scramble control data for secure and/or diverse transmission thereof, and a transmitter 208 to transmit the control data over a control channel. In one example, the control channel requestor 202 can attempt to establish a control channel with a base station or mobile device; this can be based on, or comprise information related to, an initial pilot or beacon type broadcast received by the communications apparatus 200. Upon establishing the control channel, the control data definer 204 can measure or otherwise determine values or metrics related to the control channel or the beacon/pilot communication received, for example, and scramble the data based on an ID of the communications apparatus 200 and an ID of the device to which it is communicating using the control data scrambler 206. The communications apparatus 200 can subsequently send the scrambled data to the disparate device across the control channel using the transmitter 208.

According to another example, the control data definer 204 can define and/or populate a portion, or sub-segment, of a channel (e.g., a control and/or request channel) with control data and another portion, or sub-segment, with other data. Additionally, the control data definer 204 can populate a portion, or sub-segment, of a control channel with control data of one type and another portion, or sub-segment, with control data of another type, for example. The control channel can comprise 1.25 MHz chunks of bandwidth, in one example, comprising 128 tones spread over a plurality of OFDM symbols. According to an example, a given MAC ID for a communications apparatus 200 can have a 10-bit Walsh space to transmit control data (or 1024 Walsh sequences or dimensions) as 128 tones over 8 OFDM symbols. The Walsh space refers to a time domain sequence over one or more OFDM symbols that can be used to represent information and can be partitioned into one or more disparate channels or sequences of Walsh values. In one example, the Walsh sequence can be represented by 1024 subcarriers (at a rate of 1.2288 Mbps or 1.25 MHz, for example) over 8 OFDM symbols. In a bit representation context, for example, a 5-bit CQI channel can utilize the first 32 (0-31) values or Walsh sequences and a 6-bit request channel can utilize the next 64 bits (32-95). Thus, CQI and request data can be sent on the same channel (e.g., in the same Walsh space). Therefore, upon receiving such a communication, the access point or terminal that receives the data over the channel can evaluate the Walsh space and discern both the control and request data, for example.

As described previously, the control data scrambler 206 can scramble the control data according to an identification of the communication apparatus 200 and/or one or more devices to which it is communicating. In one example, the communications apparatus 200 can be a mobile device, having a MAC ID (which can be assigned by one or more base stations, for example), communicating with a base station having a sector ID. The scrambling used by the control data scrambler 206 can be chosen and/or created according to the identifiers. Upon receiving the data, the base station can descramble the data using the identifier. It is to be appreciated that the data can additionally be scrambled by a base station and descrambled by a mobile device or other communications apparatus 200 (including a disparate base station, for example).

Moreover, the control channel requestor 202 can request communications or control channels from more than one access point or terminal in the active set; an active set can refer to access points or terminals to which the communications apparatus 200 can communicate in an area (e.g., multiple base stations or sectors in one example). Accordingly, as mentioned, the control data scrambler 206 can scramble data differently for different sectors. In one example, the communications apparatus 200 can be a mobile device having control channels, or portions thereof, related to CQI, requests, power amplifier (PA) headroom, power spectral density (PSD), and the like. One or more of these can be transmitted on disparate channels, portions of the same channel, to different access points, etc. Furthermore, the mobile device can have a pilot channel that can be received by substantially all access points or terminals in a mobile device's active set. To this end, the pilot channel communications can be scrambled using only a unique ID of the mobile device, for example, since the sector ID can vary from sector to sector (and the MAC ID may not have been assigned at this point).

Figure 3:
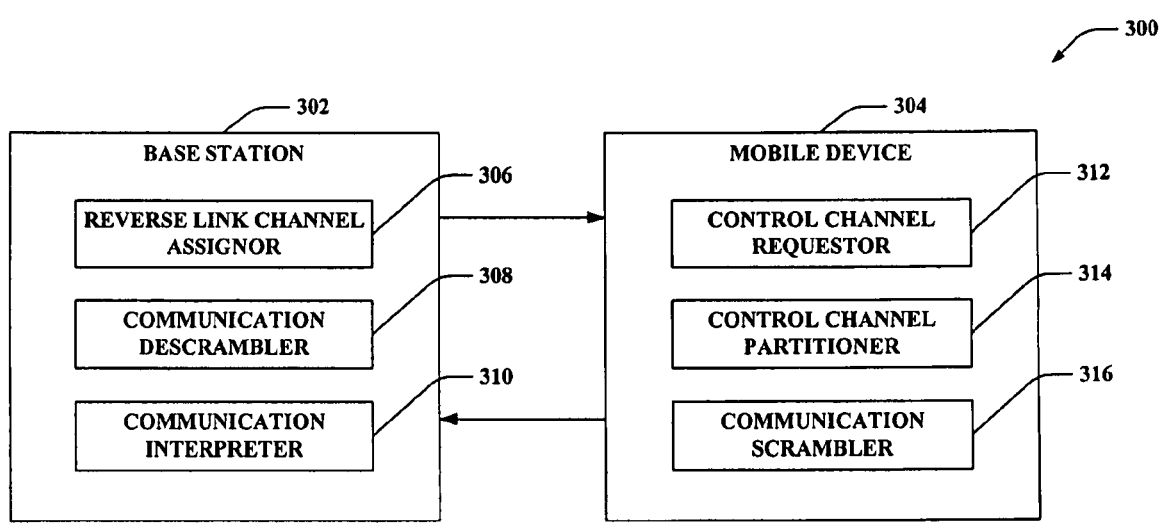
FIG. 3 is an illustration of an example wireless communications system that effectuates communicating control data.

Now referring to FIG. 3, a wireless communications system 300 that effectuates communicating reverse link acknowledgements is illustrated. The wireless communications system 300 includes a base station 302 that communicates with a mobile device 304 (and/or any number of disparate mobile devices (not shown)). The base station 302 can transmit information to the mobile device 304 over a forward link channel, for example; further, the base station 302 can receive information from the mobile device 304 over a reverse link channel and send a forward link acknowledgement to acknowledge the reverse link information. Moreover, the wireless communications system 300 can be a MIMO system in one example.

The base station 302 can include a reverse link channel assignor 306 that can process requests for reverse link channels and establish such based in part on desired resources, a communication descrambler 308 that can descramble communications received over the reverse link, and a communication interpreter 310 that can derive data from partitioned communications over the channel. The mobile device 304 can comprise a control channel requestor 312 that can request a channel for communicating control data, a control channel partitioner 314 that can divide the channel for communicating multiple control data (or request data) elements, and a communication scrambler 316 that can scramble the communication based at least in part on an ID of the mobile device 304 (such as a MAC ID, for example).

According to an example, the mobile device 304 can request establishment of a reverse link channel with a base station 302 via the control channel requestor 312; this can be in response to a beacon sent by the base station 302, for example. In this example, the request can comprise information such as CQI, SNR information, and the like based in part on the beacon symbol; the reverse link channel assignor 306 can utilize this information to assign a channel and resources dedicated thereto for the mobile device. As described, the base station 302 can host the control channel for the mobile device 304, the request channel, the pilot channel, other channels, and/or a combination thereof. Further, the channels can be allocated per MAC ID assigned to the mobile device 304 and/or according to a channel type. Moreover, the assigned channel can be partitioned to send multiple control values, request values, or other data values to maximize channel efficiency.

To this end, the control channel partitioner 314 can utilize the channel in this regard. For example, a control channel can comprise 1.25 MHz chunks spanning a given frame (which can include 128 subcarriers over 8 OFDM symbols). The control channel partitioner 314 can separate the channel into one or more sub-segments for transmitting and/or multiplexing disparate information over the channel. In this example, the 128 subcarriers can relate to 8 OFDM symbols allowing 1024 available Walsh sequences (a 10-bit space) for transmitting data. Thus, the channel can be partitioned to allow a number of Walsh sequences for given control data, for example. Moreover, the channel can use common interleaving with the Walsh spreading within a given control channel. It is to be appreciated that the channel can be partitioned in other ways as well, such as by collections of OFDM symbols, time periods for transmitting symbols, etc.

According to an example, the control channel partitioner 314 can divide the control channel into one or more logical channels for additional control information, such as channels for CQI information, request data, PA headroom data, and PSD indications. According to an example, the logical channels can have a configurable periodicity (such as in units of 8 frames, for example). Each logical channel can require $2^n$ Walsh sequences, where n is the number of required bits, to facilitate communicating of the bits. It is to be appreciated that other numbers, sizes, or representations of sequences can be desired as well (e.g., multiple of two plus some more, an arbitrary integer, a non-integer size, representing things other than integers, etc.). According to one example, CQI information can require 5 bits (or $2^5=32$ Walsh sequences) to transmit effective data, the request and PA headroom data can require 6 bits (or 64 Walsh sequences), and the PSD indication data can require 4 bits (or 16 Walsh sequences) to transmit data. Thus, the 1024 Walsh sequences are sufficient to handle the 64+64+32+16=176 required sequences. Accordingly, the information can be transferred redundantly (for reliability with respect to stronger transmission power and/or repetitive transmissions), along with other information, etc. Furthermore, the communication scrambler 316 can scramble the channel, the actual physical channel and/or logical channels, according to identification criteria. In one example, the channels can be scrambled using an identifier (such as MAC ID) for the mobile device 304; in addition (or alternatively) the scrambling can relate to a sector identifier corresponding to the base station 302. According to an example, the control channels or logical channels can be scrambled differently according to the type of data or communication, for example.

Upon scrambling, the mobile device 304 can broadcast the data over the control channel, which can be a CDMA channel. The base station 302 can receive the data and utilize the communication descrambler 308 to descramble the data. For example, the communication descrambler 308 can utilize the MAC ID for the mobile device 304 (which can have been received during channel request) and/or a sector ID, for example, to descramble the channel. In one example, different information can be used to descramble disparate channels, for example. Upon descrambling a portion of the channel (the logical or physical channel), the communication interpreter 310 can determine data sent via the channel according to the logical channel configuration as described (e.g., which portions of the channel are for which control or request data, etc.). It is to be appreciated that the logical channel configuration can be predetermined or known by the base station 302 and/or mobile device 304, sent to the base station 302 during initial channel setup from the mobile device 304, determined using inference technologies, and/or the like.

It is to be appreciated that the mobile device 304 can request a plurality of control channels from the reverse link channel assignor 306 of various base stations, for instance. According to an example, a mobile device 304 can establish (via control channel requestor 312) a CDMA control channel and an OFDMA control channel. The control channels can be established with the same or different base stations. Additionally, different data or control information can be transmitted on the control channels. Moreover, the communication scrambler 316 can scramble the control information or data communications differently according to the respective base station or a sector thereof, for example.

Figure 4:
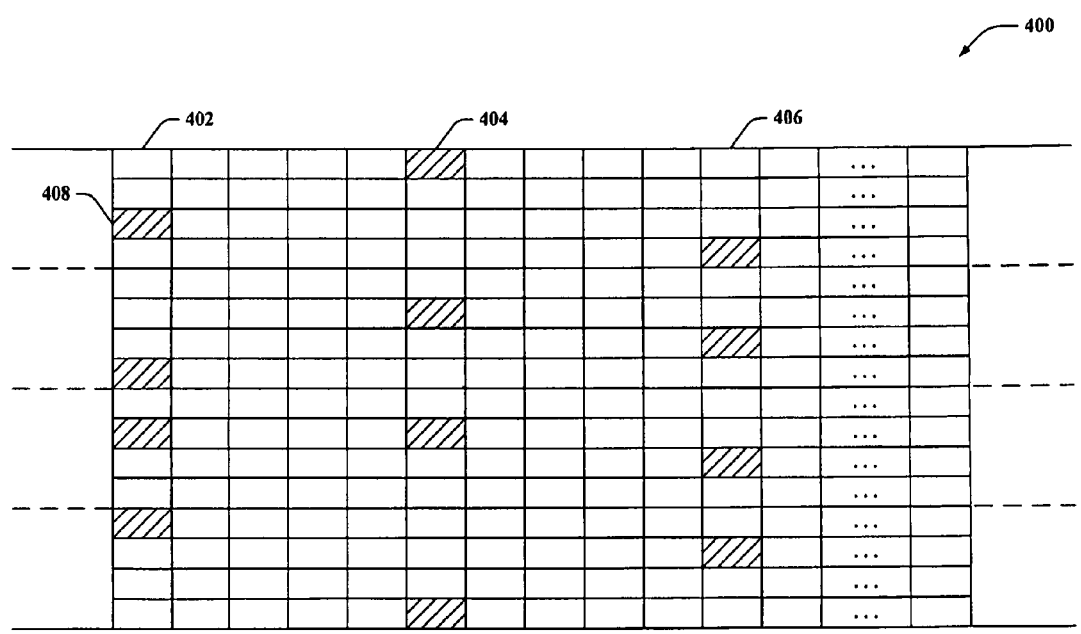
FIG. 4 is an illustration of an example communication frame between a base station and mobile device.

Now referring to FIG. 4, an example communication superframe 400 for wireless communications is shown. The superframe can comprise a plurality of symbols (such as OFDM symbols) comprising a plurality of subcarriers. The columns can represent OFDM symbol periods, which are a collection of frequency subcarriers (or tones) over a given time period. The superframe can comprise substantially any number of symbols periods, and the symbol periods can comprise substantially any number of tones. As shown, the superframe can comprise a plurality of symbol periods over which control data is transmitted 402, 404, and 406. These can also represent Walsh sequences as described above. The control data can be transmitted across a plurality of subcarriers, such as subcarrier 408 and the like. Moreover, the symbol periods can be divided into one or more segments representing a portion of the available frequency. Though groups of four symbols are shown in each segment for the purpose of explanation, it is to be appreciated that groupings of substantially any number can be comprised within the segments.

According to an example, the illustrated segments can represent control channels divided into one or more logical channels for transmitting multiple types of control information. For example, one or more logical channels can be utilized for transmitting CQI information, request data, PA headroom information, and/or PSD data. Moreover, the segments can represent different physical control channels for transmitting CDMA control data, pilot channel data, dedicated control information, feedback data (e.g., in a MIMO configuration), and/or reverse link access channel information. To this end, the segments can be scrambled differently to additionally distinguish the control data and/or to relate the data to one or more disparate sectors. As described, a mobile device can establish control channels with one or more sectors. Since the mobile devices can scramble information using a sector identifier (and/or a mobile device identifier), the scrambling can be different for the logical channels or segments of the superframe shown. Additionally, as described, the one or more channels can relate to a pilot channel for transmitting pilot data (for which there is no reverse link established); in this regard, the scrambling can just be related to the mobile device.

According to another example, the control segments can be a portion of a communication channel (e.g., a 1.25 MHz physical channel segment such as a reverse link CDMA dedicated control channel (R-CDCCH)) where each mobile device or other access terminal control channel can be spread over at least one portion (e.g., R-CDCCH sub-segment) of the physical channel segment or R-CDCCH. Moreover, this physical channel segment can hop over a larger band (e.g., 5 MHz where the control channel hops up to 4 times). To this end, the segments or sub-segments can be scrambled using different sequences that relate to the mobile devices or access terminals. Additionally, logical channels within the physical channel segments can be multiplexed within the physical channel segments by partitioning the Walsh space associated with a segment into subsets or sub-segments, as described (e.g., by using Walsh spreading with common interleaving). In this example, each subset can correspond to a logical channel and the mobile device can select a Walsh sequence within the subset corresponding to the logical channel. This selection can be based on a number of factors—for example, random assignment, sequential assignment, based on information to be sent, based on information size, based on information efficiency requirements, and the like. As shown in the figure, the control information can be sent in a plurality of symbol periods 402, 404, and 406 of a given frame or superframe, for example.

As described supra, the channel segments can be partitioned into Walsh spaces where the transmitted sequences represent a Walsh sequence. For example, the sequence in the first shown channel (e.g., logical or physical as described in the two examples above) showing symbol 408 over OFDM symbols 402, 404, and 406 can be a portion of a Walsh sequence for a single control channel indicating data (which can be interpreted as binary data). In one example, the control channel can be a CDMA control channel (e.g., R-CDCCH) that can be further divided, as described, in the following format.

| Logical Channels | Payload (bits) | Walsh Sequences |
| --- | --- | --- |
| CQI channel (r-cqich) | 5 | 32 |
| Request channel (r-reqch) | 6 | 64 |
| PA Headroom channel (r-pahch) | 6 | 64 |
| PSD channel (r-psdch) | 4 | 16 |

In this regard, the Walsh sequence chosen for the channel can represent data for the foregoing channels. In the 5-bit space for CQI, 32 Walsh sequences are needed to express values for the space. Thus, the first 32 Walsh sequences (0-31) available on the channel can be used for this expression. In the 6-bit space for the request channel, 64 Walsh sequences are required to express possible values of the space. Therefore, the next 64 Walsh sequences (32-95) can be used for this expression. This sequence continues so that the logical channels shown above can transmit in the single physical channel by utilizing the available Walsh sequences for the physical channel to convey information for the logical channels. This can minimize the total number of channels necessary to transmit control and request (and other) data, and therefore, make wireless communications more efficient.

Moreover, as described, the physical channel segments can be scrambled using different scramblings (e.g., according to identifiers for the mobile device and/or sector). For example, the physical channel segment can be scrambled according to the mobile identifier (MAC ID, for example) and/or a sector ID. This can require one descrambling per channel segment instead of per logical channel, saving descrambling resources. Alternatively, the scrambling/descrambling can require a fast Hadamard transform (FHT) engine for each scrambling. Using this approach can require only a single common FHT engine for the entire channel segment.

The logical channels shown above can defined by the information comprised therein. For example, the CQI channel can have 4-bits of broadband channel quality indicator and 1 bit of forward link serving sector information in one example. The request logical channel, which can be used to request new reverse link resources from a serving sector, can carry a quality of service (QoS) level, a buffer level and/or delay bound, and the like. Furthermore, the PA headroom channel can comprise a maximum achievable receive CoT value, which can be computed by using a pilot CoT feedback, for example, or transmitted in-band. Also, the PSD indication channel can carry information regarding suggested data PSD values for new assignments (such as a ratio of reverse link strength of the serving base station to the reverse link strength of the strongest non-serving base station, for example). For the above values, using Walsh sequences that match desired values where the total number of available Walsh sequences are split among the values can convey this information in a single Walsh sequence for an entire physical channel.

Figure 5:
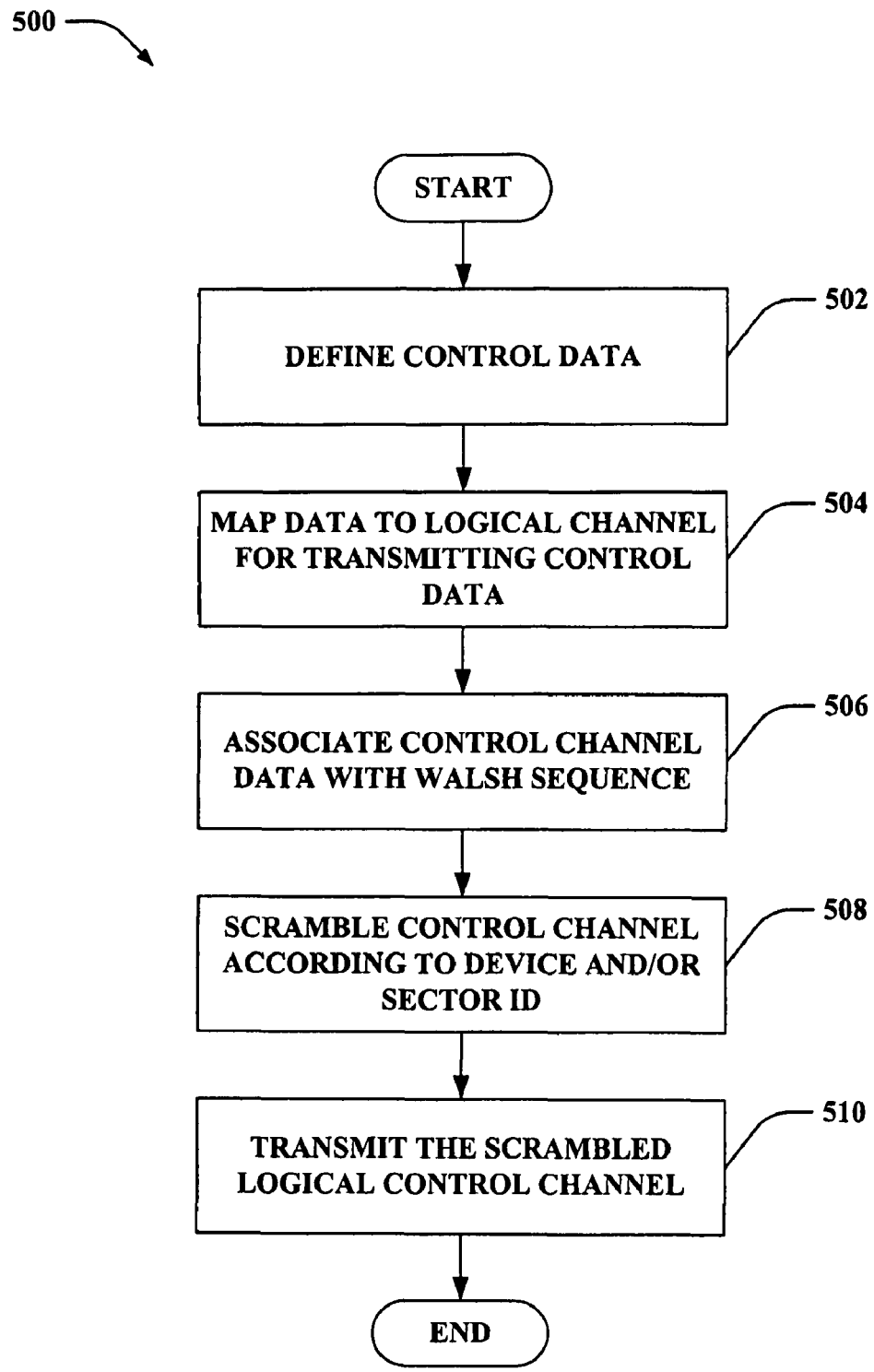
FIG. 5 is an illustration of an example methodology that facilitates communicating control data over one or more logical channels.
Figure 6:
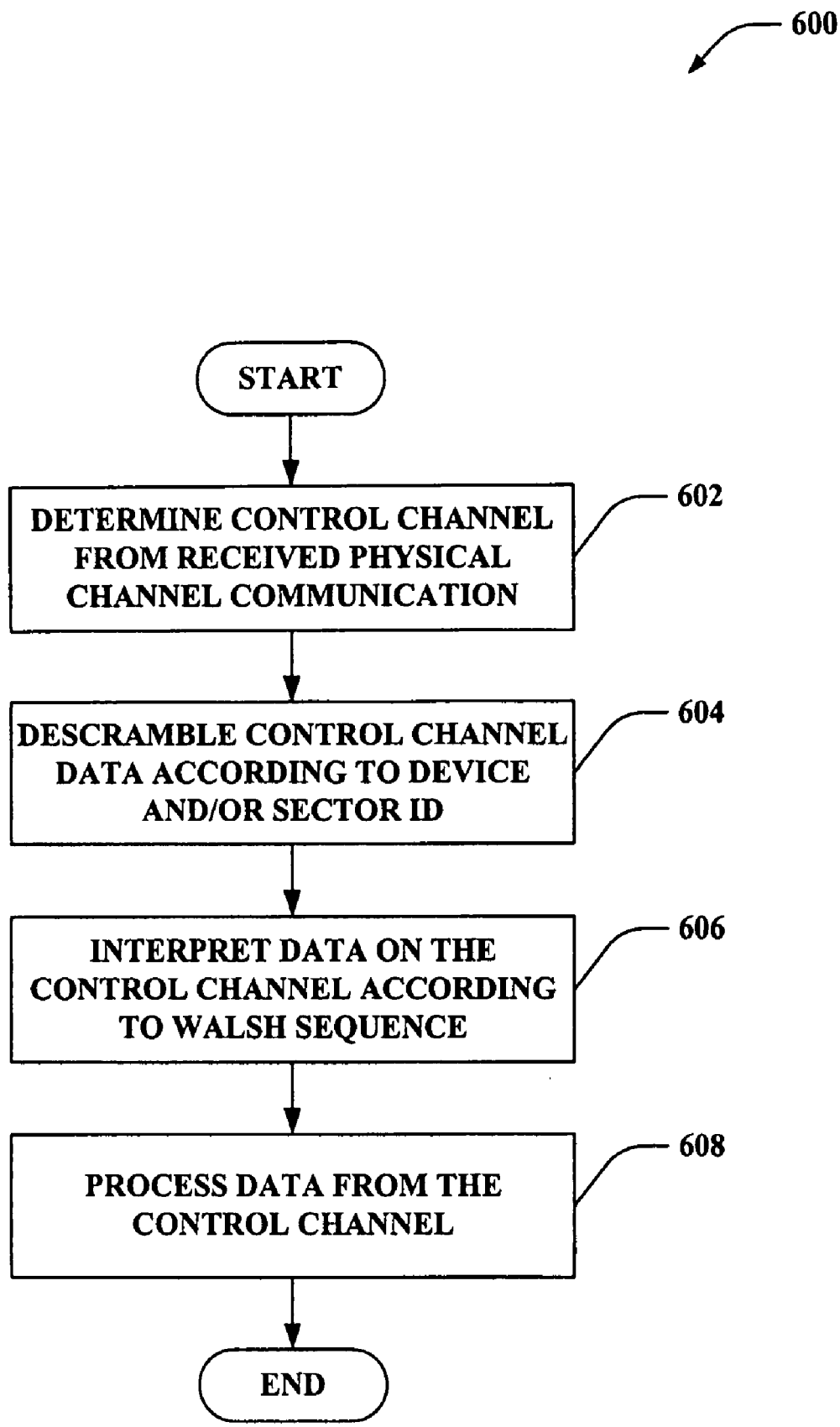
FIG. 6 is an illustration of an example methodology that facilitates receiving and interpreting control data on one or more logical channels.

Referring to FIGS. 5-6, methodologies relating to defining logical channels for control channels are illustrated. While, for purposes of simplicity of explanation, the methodologies are shown and described as a series of acts, it is to be understood and appreciated that the methodologies are not limited by the order of acts, as some acts may, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

Now referring to FIG. 5, a methodology 500 that facilitates transmitting control data over one or more scrambled logical channels is shown. At 502, control data is defined. In one example, the control data can relate to one or more mobile devices and/or communications thereof. For example, the control data can relate to a channel quality indication for a given sector or access point; the information can be obtained in a variety of ways, such as by measuring metrics related to a beacon signal sent by the sector, measuring metrics related to established channel communications, and the like. In other examples, the control data can relate to request data, PA headroom data, PSD information, pilots, MIMO feedback, and the like as described. In addition, the channel can relate to communication or non-control data as well. At 504, the data can be mapped to a logical channel for transmitting control data. As described in reference to other figures, a physical channel or channel segment can be divided into one or more logical channels for transmitting control data.

At 506, the control channel can be associated with a Walsh sequence. As described previously, the physical channel or segment thereof can have Walsh space defined to facilitate associating symbol sequences over time (such as OFDM symbols) with data bits. In this regard, the Walsh space associated with the physical channel can be divided into sequences for the different logical channels. For example, a control parameter can have the first 64 Walsh sequences (0-63) while the next parameter can have the following 16 sequences (64-79), etc.; in this regard, the logical control channels can be associated with given Walsh sequences, and the data bits desired to be sent can be defined by the Walsh sequences. Thus, in one example using the aforementioned sequences, the first control parameter having 64 Walsh sequences can define a 6-bit codeword ($2^6$=64), and the second can define a 4-bit codeword.

At 508, the control channel and/or Walsh sequence associated therewith, can be scrambled according to a device and/or sector ID. This can depend on the control data and/or control channel, for example. In one example, the data can be pilot data transmitted to no particular sector; thus, a sector ID might not be used to scramble the data as the related sectors are multiple and part of an active set. However, in this example, a device ID (MAC ID, for example) can be used to scramble the communication to differentiate from control data for other devices, for example. Additionally, the Walsh sequence for a given logical channel can be scrambled in one example. At 510, the scrambled data is transmitted to one or more sectors, for example.

With reference to FIG. 6, a methodology 600 that facilitates receiving and interpreting scrambled and/or partitioned control data is displayed. At 602, a control channel can be determined from a received physical channel communication. For example, a physical communication channel can be divided into segments for transmitting multiple types of data (control, request, etc.). Additionally, a channel segment can be divided into one or more logical channels for multiplexing control data to be sent over available Walsh sequences. According to an example, a logical channel can be provided for control data related to CQI, request data, PA headroom information, PSD information, and/or the like. The logical channel can be multiplexed such that a portion of the total available Walsh sequences for the channel can be allocated to the disparate control data fields as described.

Additionally, the fields, logical channels, and/or channel segments can be scrambled according to a sector and/or device identifier. The control channel can be descrambled according to these identifier(s) at 604. As mentioned, one or both of the IDs can be used to descramble the communication depending on the type of communication and/or information used to scramble such. At 606, the control data can be interpreted on the control channel according to a Walsh sequence related thereto. As mentioned, the data can be associated with a portion of available Walsh space for a channel; the data can be interpreted from the associated Walsh sequences transmitted. At 608, the control data from the channel can be processed. This can include, for example, adjusting channel parameters based on the received data, storing and/or logging values based on the data, closing channels, transferring channels, opening new channels, partitioning channels, and/or conceivably any operation related to wireless communications based on the control data received.

It will be appreciated that, in accordance with one or more aspects described herein, inferences can be made regarding schemes for partitioning and/or descrambling control channels. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

According to an example, one or more methods presented above can include making inferences pertaining to selecting or determining control channel partitioning. By way of further illustration, an inference can be made based in part on previous partitioning selections, partitioning of other control channels, data comprised within the control channel, etc. Additionally, inferences can be made with respect to descrambling control channel communications according to previous scrambles, ID or version of a mobile device and/or sector, other measurable information and/or the like. It is to be appreciated that the foregoing examples are illustrative in nature and are not intended to limit the number of inferences that can be made or the manner in which such inferences are made in conjunction with the various embodiments and/or methods described herein.

Figure 7:
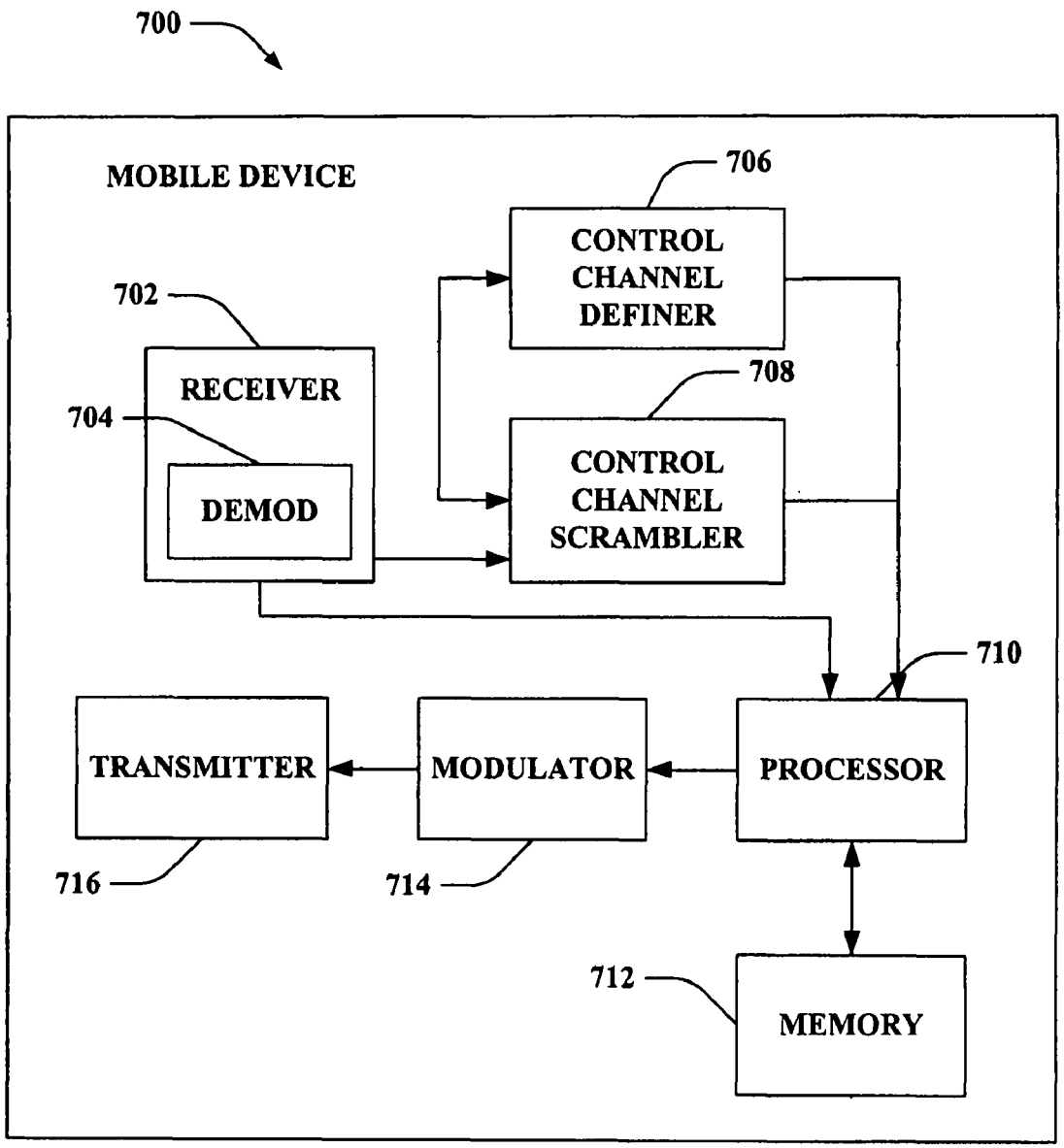
FIG. 7 is an illustration of an example mobile device that facilitates transmitting control data.

FIG. 7 is an illustration of a mobile device 700 that facilitates transmitting control data over one or more logical control channels. Mobile device 700 comprises a receiver 702 that receives a signal from, for instance, a receive antenna (not shown), and performs typical actions thereon (e.g., filters, amplifies, downconverts, etc.) and digitizes the conditioned signal to obtain samples. Receiver 702 can be, for example, an MMSE receiver, and can receive information regarding the mutually orthogonal cluster of symbols as described previously. Additionally, the mobile device 700 can comprise a demodulator 704 that can demodulate received information. Processor 710 can be a processor dedicated to analyzing information received by receiver 702 and/or generating information for transmission by a transmitter 716, a processor that controls one or more components of mobile device 700, and/or a processor that analyzes information received by receiver 702, generates information for transmission by transmitter 716, and controls one or more components of mobile device 700. Additionally, a control channel definer 706 can be provided to partition a physical channel into one or more segments and/or logical control channels as described herein and a control channel scrambler 708 that scrambles communications sent on the control channel(s).

Mobile device 700 can additionally comprise memory 712 that is operatively coupled to processor 710 and that can store data to be transmitted, received data, information related to available channels, data associated with analyzed signal and/or interference strength, information related to an assigned channel, power, rate, or the like, and any other suitable information for estimating a channel and communicating via the channel. Memory 712 can additionally store protocols and/or algorithms associated with estimating and/or utilizing a channel (e.g., performance based, capacity based, etc.). Moreover, the memory 712 can store information related to demodulation and interpretation of acknowledgement symbols and channel deassignments associated therewith, for example.

It will be appreciated that the data store (e.g., memory 712) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 712 of the subject systems and methods is intended to comprise, without being limited to, these and any other suitable types of memory.

According to an example, the mobile device 700 can request and establish a control channel link with a base station or other access point, for example. The control channel definer 706 can divide the control channel into one or more physical channel segments as described previously. The control channel segments can relate to one or more established control channels with one or more base stations, for example. The control channel definer 706 can further divide one or more channel segments into logical control channels for transmitting a portion of control information. For example, the control channel definer 706 can divide a total number of available Walsh sequences for a physical channel to the one or more logical channels. In this regard, the control channel definer 706 allows a portion of the Walsh sequences to be allocated to one or more control data values, as described in reference to other figures. In one example, a 1.25 Mhz channel can have a 10-bit Walsh space as 128 tones over 8 OFDM symbols; this provides 1024 different Walsh sequences for utilization with the logical control channels. Therefore, the sequences can be separated for use with the logical channels; the separation can be sequential, as described herein, or randomized, defined by one or more algorithms, etc.

Additionally, the control channel scrambler 708 can scramble communications over the channel according to an identifier of the mobile device 700 and/or of a sector associated therewith. As described, the scrambling can be associated with only the mobile device ID where the data is related to a pilot channel of the mobile device 700, for example. Moreover, the scrambling can be per physical channel, per channel segment, and/or per logical channel, for example. Once scrambled, the data can be transmitted over the control channel by modulating using the modulator 714 and transmitting on transmitter 716. Though shown as separate components, it is to be appreciated that the control channel definer 706, control channel scrambler 708, and/or the functionalities described therein can be implemented in whole or in part in the processor 710, for example. Additionally, the memory 712 can comprise instructions related to carrying out the aforementioned functions or data related thereto, such as scrambling algorithms, channel definitions, and/or the like.

Figure 8:
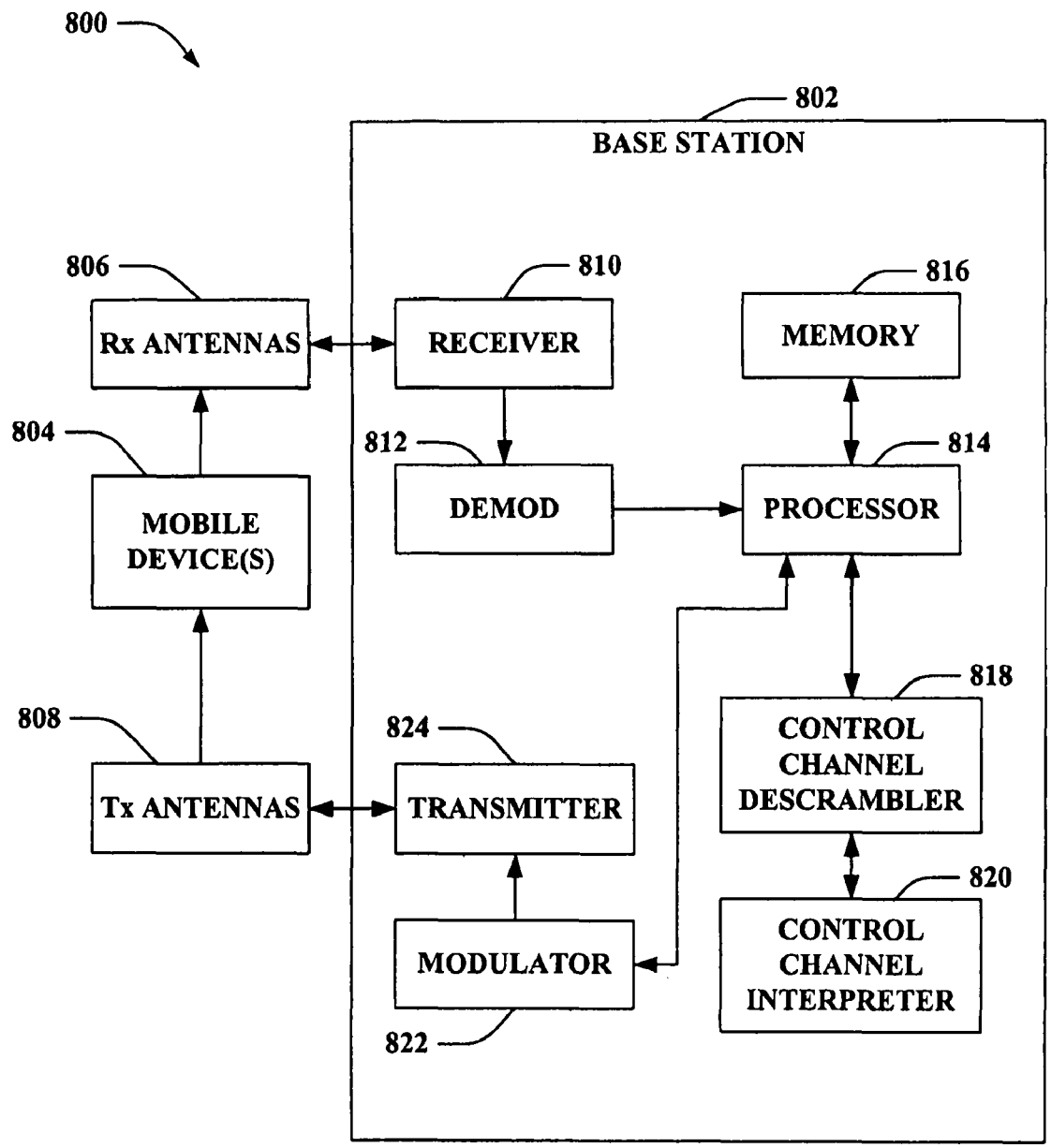
FIG. 8 is an illustration of an example system that facilitates receiving and descrambling control data.

FIG. 8 is an illustration of a system 800 that facilitates receiving and interpreting control channel data in a MIMO environment, for example. System 800 comprises a base station 802 (e.g., access point, . . . ) with a receiver 810 that receives signal(s) from one or more mobile devices 804 through a plurality of receive antennas 806, and a transmitter 824 that transmits to the one or more mobile devices 804 through a transmit antenna 808. Receiver 810 can receive information from receive antennas 806 and is operatively associated with a demodulator 812 that demodulates received information. Demodulated symbols are analyzed by a processor 814 that can be similar to the processor described above with regard to FIG. 7, and which is coupled to a memory 816 that stores information related to estimating a signal (e.g., pilot) strength and/or interference strength, data to be transmitted to or received from mobile device(s) 804 (or a disparate base station (not shown)), and/or any other suitable information related to performing the various actions and functions set forth herein. Processor 814 is further coupled to a control channel descrambler 818 that can descramble one or more control channels (or segments/logical control channels) and a control channel interpreter 820 that can interpret data from the one or more control channels, for example.

According to an example, the base station 802 can establish a control channel with one or more mobile device(s) 804 and can receive communications thereon related to control data, such as by Rx antennas 806 and receiver 810. In one example, as described, the control channel and/or communications thereon can be partitioned into one or more segments and/or logical communications channels. Moreover, the channels can be scrambled at the physical, segmented, and/or logical level to facilitate identification and differentiation among other communications. In this regard, the processor 814 can process the received communications and utilize the control channel descrambler 818 and control channel interpreter 820 to extract desired data.

For example, the control channel descrambler 818 can be used to descramble the communication according to at least an identifier of the mobile device(s) 804, but also, in some examples, an identifier of the base station 802 and/or a sector thereof for example. As described, the logical channels, segments, and/or physical channel can be scrambled; the control channel descrambler 818 can descramble at the appropriate level based on preconfiguration, inference techniques, information received from one or more mobile device(s) 804 or other base stations 802, an underlying network communicating with the base station 802, and/or the like. Upon descrambling the channels, the control channel interpreter 820 can be leveraged to derive information from the control channel. As described, the channel can be split into one or more segments and one or more logical channels that can use shared Walsh space. In one example, the channel can be logically separated for a number of control values based on a number of Walsh sequences, from those available, required to interpret the data. The control channel interpreter 820 can utilize such information to determine the transmitted Walsh sequences as control data. As described, the control channel interpreter 820 can utilize preconfiguration, inference techniques, information received from one or more mobile device(s) 804 or other base stations 802, an underlying network communicating with the base station 802, and/or the like as well as determine a control channel configuration.

Figure 9:
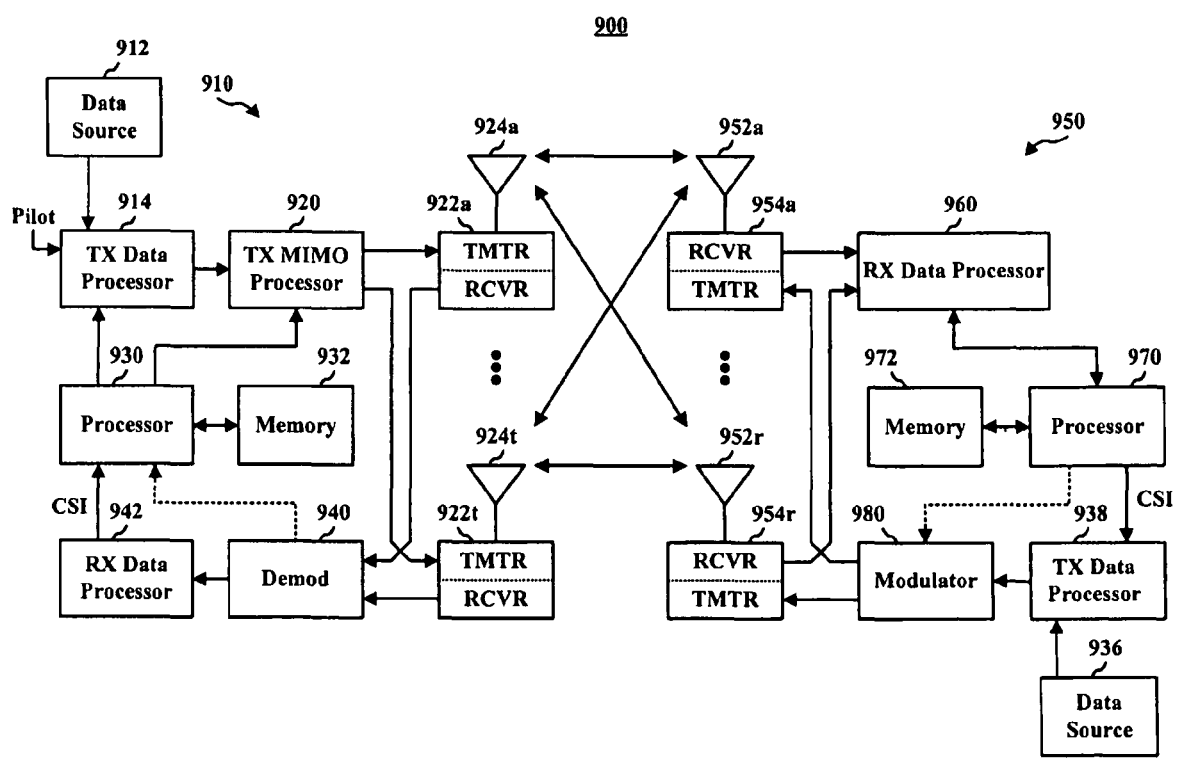
FIG. 9 is an illustration of an example wireless network environment that can be employed in conjunction with the various systems and methods described herein.

FIG. 9 shows an example wireless communication system 900. The wireless communication system 900 depicts one base station 910 and one mobile device 950 for sake of brevity. However, it is to be appreciated that system 900 can include more than one base station and/or more than one mobile device, wherein additional base stations and/or mobile devices can be substantially similar or different from example base station 910 and mobile device 950 described below. In addition, it is to be appreciated that base station 910 and/or mobile device 950 can employ the systems (FIGS. 1-3 and 7-8), techniques/configurations (FIG. 4) and/or methods (FIGS. 5-6) described herein to facilitate wireless communication there between.

At base station 910, traffic data for a number of data streams is provided from a data source 912 to a transmit (TX) data processor 914. According to an example, each data stream can be transmitted over a respective antenna. TX data processor 914 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at mobile device 950 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 930.

The modulation symbols for the data streams can be provided to a TX MIMO processor 920, which can further process the modulation symbols (e.g., for OFDM). TX MIMO processor 920 then provides $N_T$ modulation symbol streams to $N_T$ transmitters (TMTR) 922a through 922t. In various embodiments, TX MIMO processor 920 applies beamforming weights to the symbols of the data streams and to the antenna from which the symbol is being transmitted.

Each transmitter 922 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 922a through 922t are transmitted from $N_T$ antennas 924a through 924t, respectively.

At mobile device 950, the transmitted modulated signals are received by $N_R$ antennas 952a through 952r and the received signal from each antenna 952 is provided to a respective receiver (RCVR) 954a through 954r. Each receiver 954 conditions (e.g., filters, amplifies, and downconverts) a respective signal, digitizes the conditioned signal to provide samples, and further processes the samples to provide a corresponding "received" symbol stream.

An RX data processor 960 can receive and process the $N_R$ received symbol streams from $N_R$ receivers 954 based on a particular receiver processing technique to provide $N_T$ "detected" symbol streams. RX data processor 960 can demodulate, deinterleave, and decode each detected symbol stream to recover the traffic data for the data stream. The processing by RX data processor 960 is complementary to that performed by TX MIMO processor 920 and TX data processor 914 at base station 910.

A processor 970 can periodically determine which precoding matrix to utilize as discussed above. Further, processor 970 can formulate a reverse link message comprising a matrix index portion and a rank value portion.

The reverse link message can comprise various types of information regarding the communication link and/or the received data stream. The reverse link message can be processed by a TX data processor 938, which also receives traffic data for a number of data streams from a data source 936, modulated by a modulator 980, conditioned by transmitters 954a through 954r, and transmitted back to base station 910.

At base station 910, the modulated signals from mobile device 950 are received by antennas 924, conditioned by receivers 922, demodulated by a demodulator 940, and processed by a RX data processor 942 to extract the reverse link message transmitted by mobile device 950. Further, processor 930 can process the extracted message to determine which precoding matrix to use for determining the beamforming weights.

Processors 930 and 970 can direct (e.g., control, coordinate, manage, etc.) operation at base station 910 and mobile device 950, respectively. Respective processors 930 and 970 can be associated with memory 932 and 972 that store program codes and data. Processors 930 and 970 can also perform computations to derive frequency and impulse response estimates for the uplink and downlink, respectively.

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 10:
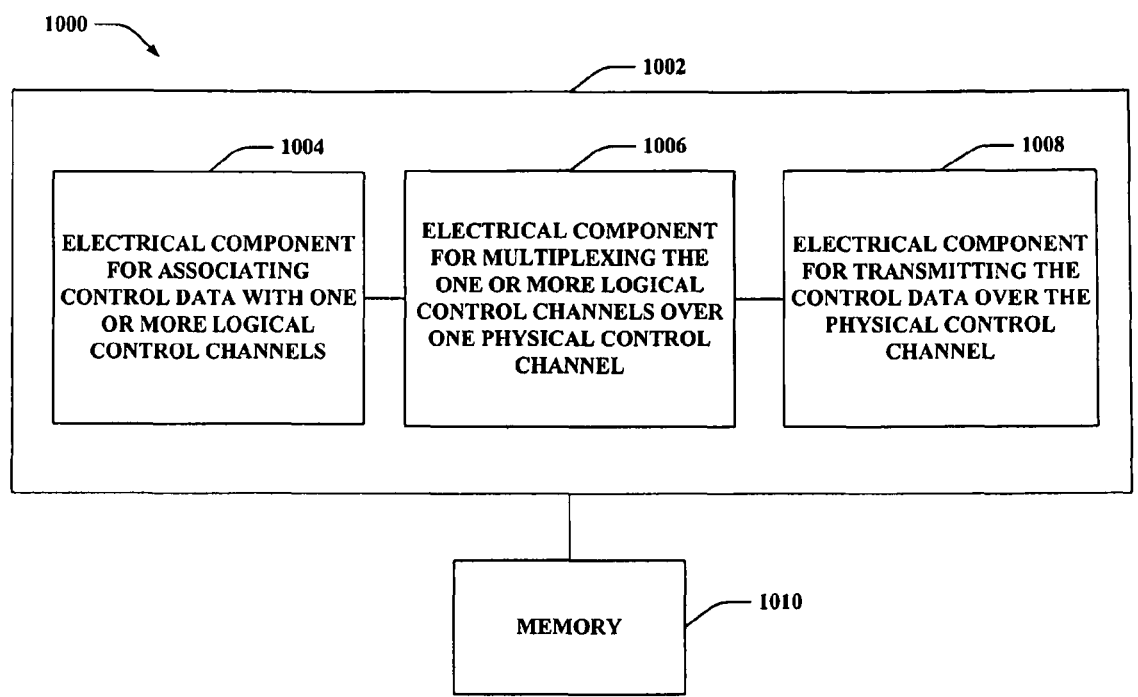
FIG. 10 is an illustration of an example system that transmits control data over a plurality of logical control channels.

With reference to FIG. 10, a system 1000 that transmits control data over one or more logical channels is illustrated. For example, system 1000 can reside at least partially within a mobile device. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for associating control data with one or more logical control channels 1004. For example, multiple control data values can be sent over the channels to allow for management of channel resources on a receiving end of the control data. Further, logical grouping 1002 can comprise an electrical component for multiplexing the one or more logical control channels over one physical control channel 1006. For example, as described, a physical control data channel (e.g., reverse link control channel or CDMA channel) can be divided into one or more logical channels by partitioning a Walsh space related thereto. Sequences of the Walsh space can be assigned to one or more logical channels allowing the channels to simultaneously transmit control data over a single physical channel. Moreover, logical grouping 1002 can include an electrical component for transmitting the control data over the physical control channel 1008. As mentioned previously, this control data can be transmitted over a reverse link channel; in one example, the channel can be established between a mobile device and a base station. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

Figure 11:
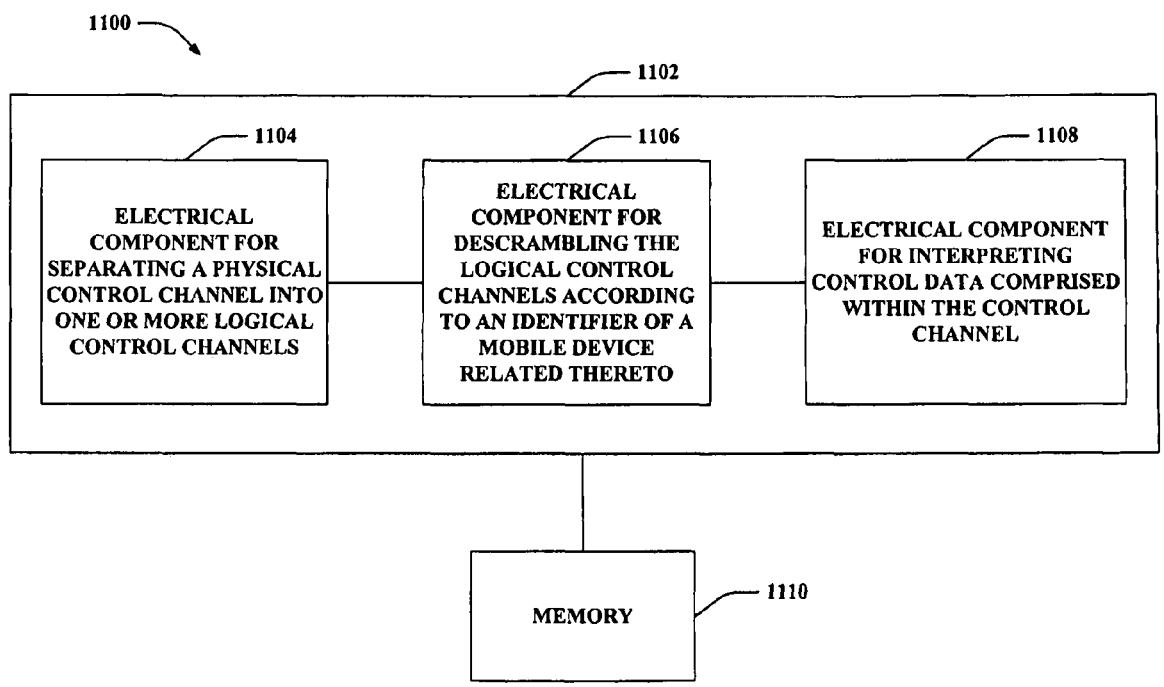
FIG. 11 is an illustration of an example system that receives and interprets control data.

Turning to FIG. 11, a system 1100 is displayed that facilitates receiving and interpreting control data from one or more logical control channels. System 1100 can reside at least partially within a base station, for instance. As depicted, system 1100 includes functional blocks that can represent functions implemented by a processor, software, or combination thereof (e.g., firmware). System 1100 includes a logical grouping 1102 of electrical components that facilitate control data receipt and descrambling. Logical grouping 1102 can include an electrical component for separating a physical control channel into one or more logical control channels 11104. As described, the mobile device can logically separate the physical control channel and the base station can interpret according to the scheme used. In one example, the mobile device can transmit this information to the base station. Moreover, logical grouping 1102 can include an electrical component for descrambling the logical control channels according to an identifier of a mobile device related thereto 1106. As mentioned, the channels, or the data thereon, can be scrambled according to an identifier of the mobile device such that the control data can be distinguished from that of other mobile devices. This can occur in the case of pilot data, for example, where an active set of base stations can receive a plurality of pilot data values. Further, logical grouping 1102 can comprise an electrical component for interpreting control data comprised within the control channel 1108. This data can relate to a CQI value, request data, PA headroom data, PSD data, pilot channel data, MIMO feedback, and/or the like. Furthermore, system 1100 can include a memory 1110 that retains instructions for executing functions associated with electrical components 1104, 1106, and 1108. While shown as being external to memory 1110, it is to be understood that electrical components 1104, 1106, and 1108 can exist within memory 1110.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for communicating control data over a wireless communications control channel, comprising:
   partitioning, using a communications device, a control channel into a plurality of logical control channels that respectively relate to one or more portions of available bandwidth;
   assigning a dedicated number of Walsh sequences in the total number of Walsh sequences available for the partitioned control channel to a logical control channel in the plurality of logical control channels;

mapping, using the communications device, control data to the logical control channel, wherein the mapping includes selecting one or more of the Walsh sequences available to the logical control channel;

scrambling the control data on the logical control channel according to one or more identifiers of one or more disparate devices; and transmitting the control data over the logical control channel.

2. The method of claim 1, wherein the selected Walsh sequences are sequential and adjacent to a set of Walsh sequences selected for a disparate logical control channel.

3. The method of claim 1, further comprising scrambling the control data on the logical control channel according to an identifier of a source of the control data.

4. The method of claim 1, further comprising establishing the control channel with the one or more disparate devices.

5. The method of claim 1, wherein the control channel comprises one or more sub-segments that span substantially 1.25 MHz over 8 OFDM symbols, and a plurality of mobile devices transmit control channels over separate sub-segments.

6. The method of claim 5, wherein the one or more sub-segments hops across an available bandwidth over time, and the periodicity of the sub-segments is configurable.

7. The method of claim 1, further comprising assigning a dedicated group of Walsh sequences in the total number of Walsh sequences available for the partitioned control channel to each respective logical control channel in the plurality of logical control channels.

8. The method of claim 1, wherein the control channel is a physical control channel.

9. A wireless communications apparatus, comprising:
a processor; and
a memory, coupled to the processor and storing instructions, that when executed by the processor, cause the processor to partition a control channel into a plurality of logical control channels that respectively relate to one or more portions of available bandwidth, and assign a dedicated number of Walsh sequences in the total number of Walsh sequences available for the partitioned control channel to a logical control channel in the plurality of logical control channels, wherein the processor is further configured to scramble control data on at least one logical control channel of the plurality of logical control channels, according to one or more identifiers of one or more disparate devices.

10. The wireless communications apparatus of claim 9, wherein the processor is further configured to map control data to the associated logical control channel in the plurality of logical control channels and transmit the control data over the logical control channel.

11. The wireless communications apparatus of claim 10, wherein the control data comprises request data and channel quality information (CQI) measured based on one or more metrics of the control channel or a received beacon signal, wherein the CQI and request data are mapped to disparate control channels.

12. The wireless communications apparatus of claim 9, wherein the total number of Walsh sequences is divided among the logical control channels in sequential sequences, wherein a given sequential sequence for a given logical control channel is adjacent to at least one other sequential sequence for another logical control channel.

13. The wireless communications apparatus of claim 9, wherein the plurality of logical control channels have a configurable periodicity.

14. The wireless communications apparatus of claim 9, wherein the memory stores further instructions, that when executed by the processor, assign a dedicated group of Walsh sequences in the total number of Walsh sequences available for the partitioned control channel to each respective logical control channel in the plurality of logical control channels.

15. The wireless communications apparatus of claim 9, wherein the control channel is a physical control channel.

16. The wireless communications apparatus of claim 15, wherein the processor is further configured to establish the physical control channel with the one or more disparate devices.

17. The wireless communications apparatus of claim 16, wherein the processor is further configured to transmit a configuration to the one or more disparate devices, and the physical control channel is divided into the plurality of logical control channels based at least in part on the configuration.

18. A computer program product, comprising:
a non-transitory computer-readable storage medium having stored thereon:
code for causing a computer to partition a control channel into a plurality of logical control channels that respectively relate to one or more portions of available bandwidth;
code for assigning a dedicated number of Walsh sequences in the total number of Walsh sequences available for the partitioned control channel to a logical control channel in the plurality of logical control channels;
code for causing the computer to map control data to the logical control channel, wherein the mapping includes selecting one or more of the Walsh sequences available to the logical control channel;
code for scrambling control data on the logical control channel according to one or more identifiers of one or more disparate devices; and
code for causing the computer to transmit the control data over the logical control channel.

19. The computer program product of claim 18, further comprising code for assigning a dedicated group of Walsh sequences in the total number of Walsh sequences available for the partitioned control channel to each respective logical control channel in the plurality of logical control channels.

20. The computer program product of claim 18, wherein the control channel is a physical control channel.

21. The computer program product of claim 18, wherein the selected Walsh sequences are sequential and adjacent to a set of Walsh sequences selected for a disparate logical control channel.

22. The computer program product of claim 18, further comprising code for scrambling the control data on the logical control channel according to an identifier of a source of the control data.

23. The computer program product of claim 18, further comprising code for establishing the control channel with the one or more disparate devices.

24. The computer program product of claim 18, wherein the control channel comprises one or more sub-segments that span substantially 1.25 MHz over 8 OFDM symbols, and a plurality of mobile devices transmit control channels over separate sub-segments.

25. The computer program product of claim 24, wherein the one or more sub-segments hops across an available bandwidth over time, and the periodicity of the sub-segments is configurable.

26. The computer program product of claim 24, wherein the computer program product is integrated with a mobile device.

27. A communications device, comprising:
- means for partitioning, using the communications device, a control channel into a plurality of logical control channels that respectively relate to one or more portions of available bandwidth;
- means for assigning a dedicated number of Walsh sequences in the total number of Walsh sequences available for the partitioned control channel to a logical control channel in the plurality of logical control channels;
- means for mapping, using the communications device, control data to the logical control channel, wherein the mapping includes selecting one or more of the Walsh sequences available to the logical control channel for transmitting the control data, and wherein the Walsh sequences relate to a total number of Walsh sequences available for the partitioned control channel;
- means for scrambling the control data on the logical control channel according to one or more identifiers of one or more disparate devices; and
- means for transmitting the control data over the logical control channel.

28. The communications device of claim 27, further comprising means for assigning a dedicated group of Walsh sequences in the total number of Walsh sequences available for the partitioned control channel to each respective logical control channel in the plurality of logical control channels.

29. The communications device of claim 27, wherein the control channel is a physical control channel.

30. The communications device of claim 27, wherein the selected Walsh sequences are sequential and adjacent to a set of Walsh sequences selected for a disparate logical control channel.

31. The communications device of claim 27, further comprising means for scrambling the control data on the logical control channel according to an identifier of a source of the control data.

32. The communications device of claim 27, further comprising means for establishing the control channel with the one or more disparate devices.

33. The communications device of claim 27, wherein the control channel comprises one or more sub-segments that span substantially 1.25 MHz over 8 OFDM symbols, and a plurality of mobile devices transmit control channels over separate sub-segments.

34. The communications device of claim 33, wherein the one or more sub-segments hops across an available bandwidth over time, and the periodicity of the sub-segments is configurable.

* * * * *